Sept. 30, 1941.  C. K. HANSEN  2,257,498
TIRE INFLATION APPARATUS
Filed Oct. 10, 1939
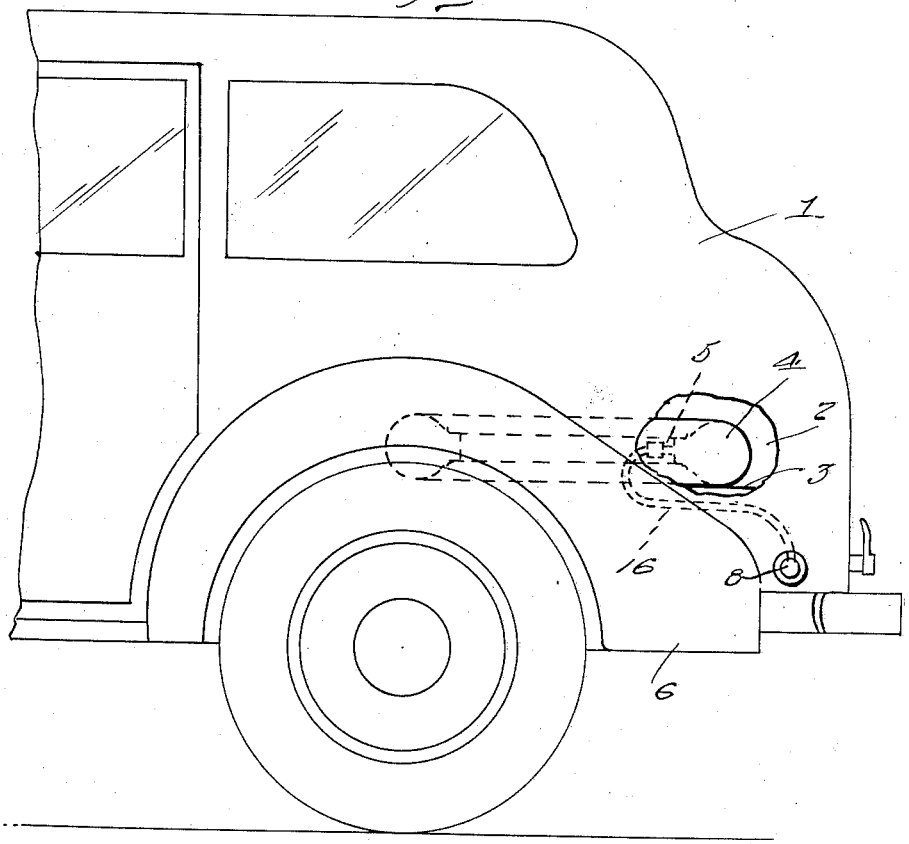
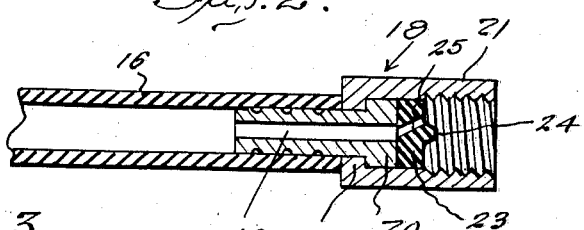
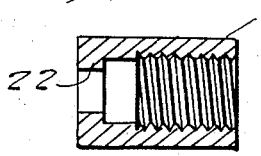
Inventor
C. K. Hansen
By Clarence A. O'Brien
and Hyman Berman
Attorneys Patented Sept. 30, 1941

2,257,498

UNITED STATES PATENT OFFICE 2,257,498

TIRE INFLATION APPARATUS

Clarence K. Hansen, Racine, Wis.

Application October 10, 1939, Serial No. 298,844

1 Claim. (Cl. 284—19)

My invention relates to improvements in tire inflation apparatus for use in connection with the spare tires of automobiles.

The principal object in view is to provide inexpensive apparatus of the character indicated which may be readily installed on present day automobiles for coupling to a source of air under compression to inflate a spare tire in the usual trunk compartment without necessitating unlocking and opening said compartment.

To the accomplishment of the above, and subordinate objects presently appearing, a preferred embodiment of my invention has been illustrated in the accompanying drawing, set forth in detail in the succeeding description and defined in the claim appended hereto.

In said drawing:

Figure 1 is a fragmentary view in side elevation of an automobile equipped according to my invention.

Figure 2 is a fragmentary view in longitudinal section of the invention detached, and Figure 3 is a view in longitudinal section of the coupling sleeve.

Referring to the drawing by numerals, I have shown my invention therein as applied to the usual type of automobile, 1 designating the body and 2 the rear trunk compartment provided with a support 3 therein for a spare tire 4 having a valve stem 5.

According to my invention, one side of the body 1 preferably in the rear of the fender 6 has suitably secured therein the casing of the usual inwardly opening tire valve represented at 8, and for attachment to said valve of the usual service air line (not shown) from the exterior of the automobile.

A short length of flexible hose 16, is suitably secured at one end to the inner end of the valve 8, and extended into the compartment 2 with its other end detachably secured to the valve stem 5 of the tire 4 by a coupling 18.

The coupling 18 comprises a circumferentially grooved nipple 19 suitably secured in said other end of the hose 16 and having a radially flanged outer end 20 extending from said hose. An internally threaded coupling sleeve 21 is rotatably mounted on the outer end 20 of the nipple 19 to extend therefrom, and by means of an internal inner end flange 22 fitting snugly around said nipple intermediate said end 20 and the end of the hose 16, said flange 22 being held against the end 20 of the nipple 19 by the hose. The sleeve 21 is of the proper internal diameter to be turned onto the valve stem 5, and of the proper length to force the end 20 of the nipple 19 tight against the outer end of said stem under turning of said sleeve.

As will be understood, when it is desired to introduce air into the tire 4, the fitting of the usual service air line, not shown, is connected to the valve 8 for the passage of air therethrough under control of the valve 8 into the hose 16 and from the latter by way of the coupling 18 into the valve stem 5 and tire 4. When it is desired to use the tire 4 the hose 16 may be easily detached from the tire by unscrewing the sleeve 21 from the valve stem 5. The sleeve 21 is preferably knurled to facilitate gripping in turning.

In order that the pressure in the tire may be checked by the usual pressure gage applied to the valve 8, a disk 23 preferably of resilient material is fitted in the coupling 18 against the nipple 19, said disk being provided with an axial teat 24 designed to engage the valve stem, not shown, of the tire valve and push the same inwardly to maintain said tire valve open. A transverse port 25 in said disk 23 registering with the bore of the nipple 19 provides for pressure from the tire backing up in the hose 16.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

A device for attaching one end of a valved tire inflation tube to a tire valve and to hold said valve open comprising an axially bored nipple adapted for insertion in said end of the tube, a coupling rotatable on said nipple and adapted for attachment to said valve, and a resilient disc fitting in said coupling and against said nipple and having an axial teat adapted to extend into said valve and bear against the valve stem to hold the valve open, said disc having an air passage extending therethrough obliquely to register with the bore of the nipple and to avoid said teat.

CLARENCE K. HANSEN.